(12) United States Patent
Kurosawa

(10) Patent No.: US 7,638,175 B2
(45) Date of Patent: Dec. 29, 2009

(54) ALIGNMENT FILM, METHOD OF FORMING THE ALIGNMENT FILM, LIQUID CRYSTAL PANEL, AND ELECTRONIC EQUIPMENT

(75) Inventor: Ryuichi Kurosawa, Okaya (JP)

(73) Assignee: Seiko Epson Corporation (JP)

( * ) Notice: Subject to any disclaimer, the term of this patent is extended or adjusted under 35 U.S.C. 154(b) by 316 days.

(21) Appl. No.: 11/390,004

(22) Filed: Mar. 27, 2006

(65) Prior Publication Data

US 2006/0222785 A1 Oct. 5, 2006

(30) Foreign Application Priority Data

Mar. 29, 2005 (JP) .............................. 2005-096285

(51) Int. Cl.
*G02F 1/1337* (2006.01)
(52) U.S. Cl. ........................ 428/1.2; 349/126
(58) Field of Classification Search .................. 428/1.2; 349/123–124
See application file for complete search history.

(56) References Cited

U.S. PATENT DOCUMENTS

| 3,947,184 | A | | 3/1976 | Saeva et al. | |
|---|---|---|---|---|---|
| 5,766,673 | A | * | 6/1998 | Nogami et al. | ................ 427/58 |
| 5,814,711 | A | | 9/1998 | Choe et al. | |
| 2004/0249103 | A1 | * | 12/2004 | Morimoto et al. | ............. 528/34 |

FOREIGN PATENT DOCUMENTS

| JP | 58-111922 | 7/1983 |
|---|---|---|
| JP | 10-161133 | 6/1998 |
| JP | 2004-341165 | 12/2004 |
| JP | 2005-4177 | 6/2005 |

OTHER PUBLICATIONS

JPO Website Machine English Translation of JP 2004-341165, Hirai et al., Dec. 12, 2004.*
Communication from European Patent Office re: related application.

* cited by examiner

*Primary Examiner*—David R Sample
*Assistant Examiner*—Sophie Hon
(74) *Attorney, Agent, or Firm*—Harness, Dickey & Pierce, P.L.C.

(57) ABSTRACT

An alignment film for controlling orientation of liquid crystal molecules is formed of an organic silicon material which includes in its molecule an affinity imparting group for enhancing affinity to the liquid crystal molecules and an orientation characteristic imparting group for controlling orientation of the liquid crystal molecules. The affinity imparting group is at least one selected from the group comprising a vinyl group, an alkylene group, and a cyanoalkyl group, and the orientation characteristic group is at least one selected from the group comprising a phenyl group, a substituted phenyl group, a phenyl-alkyl group, a substituted phenyl-alkyl group, a branched alkyl group having carbon atoms of 3 to 12. Preferably, the organic silicon material includes organopolysilsesquioxane having a cage structure or a partially cleaved cage structure. A liquid crystal panel having the alignment film, and electronic equipment provided with the liquid crystal panel are also provided.

4 Claims, 5 Drawing Sheets

ALIGNMENT FILM, METHOD OF FORMING THE ALIGNMENT FILM, LIQUID CRYSTAL PANEL, AND ELECTRONIC EQUIPMENT

CROSS-REFERENCE

The entire disclosure of Japanese Patent Application No. 2005-096285 filed on Mar. 29 is expressly incorporated by reference herein.

BACKGROUND OF THE INVENTION

1. Field of the Invention

The present invention relates to an alignment film (orientation film), a method of forming the alignment film, a liquid crystal panel, and electronic equipment, and more particularly relates to an organic film, a method of forming the alignment film, a liquid crystal panel provided with the alignment film, and electronic equipment provided with the liquid crystal panel.

2. Description of the Related Art

There is known a projection type display apparatus that projects an image on a screen. In most of such projection type display apparatuses, a liquid crystal panel is used for forming the image.

Such a liquid crystal panel usually has alignment films (orientation films) that are set to develop a predetermined pre-tilt angle to align or orient liquid crystal molecules in a fixed direction. As a method of manufacturing such alignment films, there is known, for example, a method in which a thin film consisting of a high-molecular compound such as polyimide and formed on a substrate is subjected to rubbing treatment by rubbing the thin film in one direction with a cloth of rayon or the like (see, for example, JP-A No. H10-161133).

However, the alignment films formed of a high-molecular compound such as polyimide may cause photo-deterioration because of various factors such as an environment of use, time of use, and the like. When such photo-deterioration occurs, materials forming the alignment films, liquid crystal layers and the like are likely to decompose, and decomposition products thereof may adversely affect performance of liquid crystal. Further, in the rubbing treatment, static electricity is generated and dust is also produced, thereby lowering reliability of the liquid crystal panel.

For the purpose of solving such a problem, it is attempted to adopt an alignment film formed of an inorganic material. In general, such an inorganic alignment film is formed by an oblique vapor deposition method.

Such an inorganic alignment film is superior in light resistance and heat resistance as compared to an alignment film formed of an organic material, but in turn has a problem in that its ability of orientating liquid crystal molecules is low.

SUMMARY

The present invention has been made in view of the problem described above. Therefore, it is an object of the present invention to provide an alignment film (orientation film) having excellent light resistance and excellent orientation characteristic (that is, a function of regulating an orientation state of a liquid crystal material). Further, it is also an object of the present invention to provide a method of manufacturing the alignment film which is capable of manufacturing such an alignment film effectively. Furthermore, it is also an object of the present invention to provide a liquid crystal panel provided with the alignment film, and electronic equipment provided with the liquid crystal panel.

In order to achieve the above mentioned objects, the present invention is directed to an alignment film for controlling alignment (orientation) of liquid crystal molecules. The alignment film is mainly formed of an organic silicon material, and the organic silicon material has in its molecule at least one affinity imparting group for increasing affinity to the liquid crystal molecules and at least one orientation characteristic imparting group for controlling orientation of the liquid crystal molecules.

This makes it possible to provide an alignment film having excellent light resistance and excellent orientation characteristic (that is, a function of regulating an orientation state of a liquid crystal material).

In the alignment film according to the present invention, it is preferred that the affinity imparting group is at least one selected from the group comprising a vinyl group, an alkylene group, and a cyanoalkyl group.

Since these groups can increase affinity with liquid crystal molecules effectively, it is possible to align the liquid crystal molecules in a more stable manner to thereby increase orientation characteristic.

Further, in the alignment film according to the present invention, it is also preferred that the orientation characteristic imparting group is at least one selected from the group comprising a phenyl group, a substituted phenyl group, a phenyl-alkyl group, a substituted phenyl-alkyl group, and a branched alkyl group having carbon atoms of 3 to 12.

Use of such groups makes it possible to set a pre-tilt angle of liquid crystal molecules to a desired angle effectively, thereby enabling to exhibit more excellent orientation characteristic.

Further, in the alignment film according to the present invention, it is also preferred that the organic silicon material contains as its main component a polysiloxane material having the affinity imparting group and the orientation characteristic imparting group.

This also makes it possible to provide an alignment film having excellent light resistance and excellent orientation characteristic.

In this case, it is preferred that the polysiloxane material includes organopolysilsesquioxane having a cage structure or a partially cleaved cage structure.

This makes it possible to provide an alignment film having more excellent light resistance and more excellent orientation characteristic.

Furthermore, in the alignment film according to the present invention, it is also preferred that the polysiloxane material is formed by condensation polymerization of alkoxysilane.

This makes it possible to prepare the polysiloxane material easily.

In this case, it is preferred that the alkoxysilane includes two or more kinds of alkoxysilane compounds having different compositions.

This makes it possible to easily adjust the existing ratio of the affinity imparting group and the orientation characteristic imparting group in the organic silicon material constituting the alignment film.

In this case, it is preferred that the alkoxysilane compounds having different compositions include an alkoxysilane compound having the affinity imparting group and an alkoxysilane compound having the orientation characteristic imparting group.

This also makes it possible to easily adjust the existing ratio of the affinity imparting group and the orientation characteristic imparting group in the organic silicon material constituting the alignment film.

Moreover, in the alignment film according to the present invention, it is also preferred that a weight average molecular weight of the organic silicon material is in the range of 500 to 50,000.

This makes it possible to obtain an alignment film having optical and physical stabilities.

Another aspect of the present invention is directed to a method of forming an alignment film. The method comprises the steps of:

preparing a substrate;

preparing an alignment film formation liquid which contains a material for forming the organic silicon material, the material containing as its major component a polysiloxane material having the affinity imparting group and the orientation characteristic imparting group;

applying the alignment film formation liquid onto the substrate; and curing the applied alignment film formation liquid containing the polysiloxane material to form the alignment film on the substrate.

According to the alignment film forming method described above, it is possible to form an alignment film having excellent light resistance and excellent orientation characteristic effectively.

In the alignment film forming method described above, it is preferred that the polysiloxane material is formed by condensation polymerization of alkoxysilane, and has at least one curing reaction group which contributes to a curing reaction of the alignment film formation liquid.

This makes it possible to improve film formation characteristic of the alignment film formation liquid. As a result, it is possible to form an alignment film having a physical stability.

In this case, it is preferred that the curing reaction group is at least one selected from the group comprising a glycidoxy-alkyl group, an alicyclic epoxy-alkyl group, an acryloyl group, a methacryloyl group, a styryl group, and a styryl-alkyl group.

Use of such groups makes it possible to form a stable alignment film easily.

In the alignment film forming method described above, it is preferred that the curing of the alignment film formation liquid is carried out by means of heat treatment and/or energy ray irradiation treatment to cure the curing reaction groups of the polysiloxane material.

This also makes it possible to form a stable alignment film easily.

Other aspect of the present invention is directed to a liquid crystal panel, comprising:

a liquid crystal layer having both sides;

a pair of alignment films respectively contacted at the both sides of the liquid crystal layer, each alignment film being formed from the alignment film; and a pair of electrodes providing the pair of alignment films which do not face the liquid crystal layer.

Such a liquid crystal panel can have excellent light resistance and excellent orientation characteristic.

Yet other aspect of the present invention is directed to electronic equipment provided with the liquid crystal panel.

Such electronic equipment can have high reliability.

These and other objects, structures and advantages of the present invention will be more apparent from the following detailed description of the invention and the examples thereof which proceeds with reference to the accompanying drawings.

DETAILED DESCRIPTION OF THE INVENTION

Hereinbelow, embodiments of the present invention will be described in detail with reference to the accompanying drawings.

Prior to explanation of an alignment film (orientation film) and a method of forming the alignment film (orientation film), a liquid crystal panel according to the present invention will be first explained.

Figure 1:
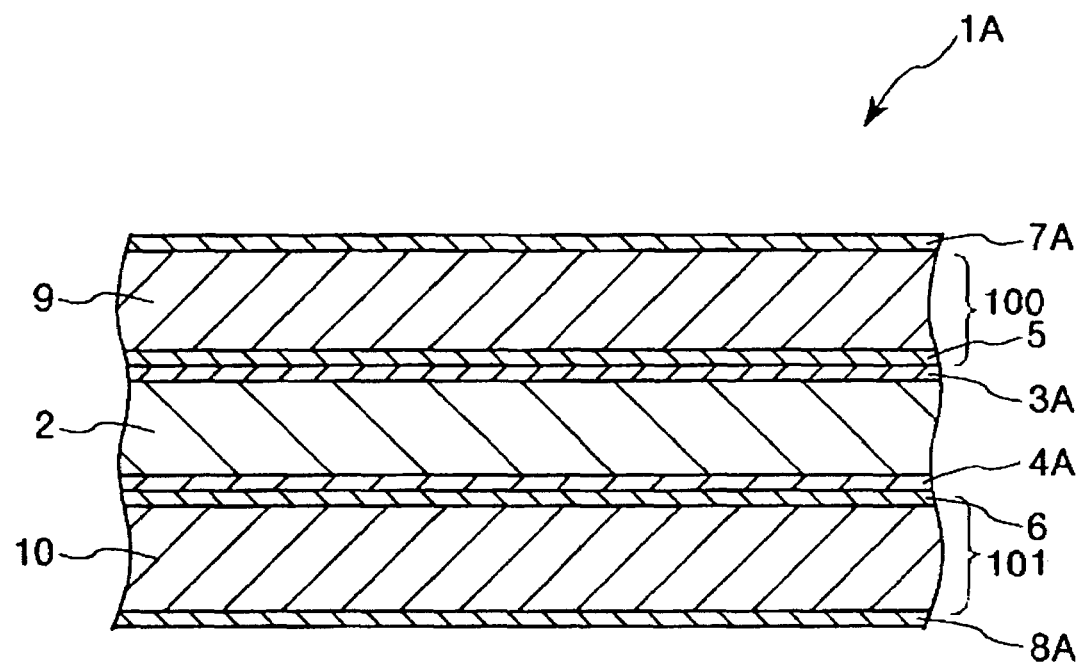
FIG. 1 is a schematic longitudinal sectional view showing the liquid crystal panel of the first embodiment of the present invention.

FIG. 1 is a schematic longitudinal sectional view showing the liquid crystal panel of the first embodiment of the present invention.

As shown in FIG. 1, a liquid crystal panel 1A includes a liquid crystal layer 2, alignment films (orientation films) 3A and 4A, transparent conductive films 5 and 6 serving as electrodes, polarizing films 7A and 8A, and substrates 9 and 10.

The liquid crystal layer 2 is mainly formed of a liquid crystal material.

The liquid crystal material forming the liquid crystal layer 2 may be any liquid crystal material such as nematic liquid crystal or smectic liquid crystal as long as the liquid crystal material can be oriented. However, in the case of a TN-type liquid crystal panel, a liquid crystal material forming the nematic liquid crystal is preferable. Examples of the liquid crystal material include phenylcyclohexane derivative liquid crystal, biphenyl derivative liquid crystal, vinylcyclohexane derivative liquid crystal, terphenyl derivative liquid crystal, phenylether derivative liquid crystal, phenylester derivative liquid crystal, bicyclohexane derivative liquid crystal, azometin derivative liquid crystal, azoxy derivative liquid crystal, pyrimidine derivative liquid crystal, dioxane derivative liquid crystal, and cubane derivative liquid crystal, and the like. The liquid crystal material also include liquid crystal molecules obtained by introducing a fluorine substituent group such as monofluoro group, diofluoro group, trifluoro group, trifluoromethyl group, or trifluoromethoxy group to the nematic liquid crystal molecules.

The alignment films 3A and 4A are arranged on both surfaces of the liquid crystal layer 2.

The alignment film 3A is formed on a matrix 100 consisting of the transparent conductive film 5 and the substrate 9 described later. The alignment film 4A is formed on a matrix 101 consisting of the transparent conductive film 6 and the substrate 10 described later. Namely, one alignment film is provided in contact with each of the electrodes.

The alignment films 3A and 4A have a function of regulating an orientation state (at the time when no voltage is applied) of the liquid crystal material (liquid crystal molecules) forming the liquid crystal layer 2.

These alignment films 3A and 4A are formed, for example, by a method described below (that is, a method of forming the alignment film according to the present invention), and they are mainly formed of an organic silicon material.

The organic silicon material is a composite material of a polysiloxane and an organic compound, and it has a superior chemical stability as compared to other organic materials. Therefore, the alignment film of the present invention can have excellent light resistance as compared to conventional alignment films formed of the organic materials.

In particular, in the present invention, as the organic silicon material constituting the alignment film, an organic silicon material which has in its molecule at least one affinity imparting group for increasing affinity to the above-described liquid crystal material (liquid crystal molecules) and at least one orientation characteristic imparting group for controlling orientation of the liquid crystal molecules is used, and this is the feature of the present invention.

In this regard, it is to be noted that alignment films formed of an inorganic material have superior light resistance as compared to the prior art alignment films formed of an organic material. On the other hand, however, such alignment films formed of an inorganic material has low affinity with liquid crystal molecules, so that there is a problem in that it is difficult to regulate an orientation state of liquid crystal molecules, that is an ability of orientating liquid crystal molecules of the alignment films is low.

However, as described above, the present invention uses, as the organic silicon material constituting the alignment film, an organic silicon material which has in its molecule an affinity imparting group for increasing affinity to the above-described liquid crystal material (liquid crystal molecules) and an orientation characteristic imparting group for controlling orientation of the liquid crystal molecules to thereby increase affinity with liquid crystal molecules so that the liquid crystal molecules can be drawn to the alignment film so as to easily regulate an orientation state of the liquid crystal molecules. This makes it possible for the orientation characteristic imparting group to regulate the orientation state of the liquid crystal molecules so that the liquid crystal molecules are oriented so as to have a desired pre-tilt angle. With this result, it is possible to provide an alignment film having excellent orientation characteristic (that is, a function of regulating an orientation state of a liquid crystal material) as well as excellent light resistance. Further, since adhesion with transparent electrodes is also improved, reliability of finally obtained electronic equipment is also improved.

Such advantages can not be obtained in the case where the organic silicon material has only either of the affinity imparting group or the orientation characteristic imparting group.

Namely, in the case where the organic silicon material has only the affinity imparting group, it is possible to draw the liquid crystal molecules to the surface of the alignment film, but it is difficult to orientate the liquid crystal molecules in a predetermined direction. On the other hand, in the case where the organic silicon material has only the orientation characteristic imparting group, it is difficult to draw the liquid crystal molecules to the surface of the alignment film sufficiently due to low affinity with the liquid crystal molecules, and thus it becomes difficult to regulate the orientation state of the liquid crystal molecules.

Examples of the affinity imparting group include a vinyl group, an alkylene group, a cyanoalkyl group, a phenyl group, a substituted phenyl group, an alkylidene group, and the like.

Among these groups, a vinyl group, an alkylene group, an alkylidene group, and a cyanoalkyl group can be preferably used as the affinity imparting group included in the organic silicon material constituting the alignment films 3A and 4A. The organic silicon material may contain at least one or tow or more of these groups as its affinity imparting groups. This makes it possible to increase the affinity with liquid crystal molecules more effectively, so that the liquid crystal molecules can be aligned in a more stable state to thereby improve the orientation characteristic thereof.

Further, examples of the orientation characteristic imparting group include a phenyl group, a substituted phenyl group, a phenyl-alkyl group, a substituted phenyl-alkyl group, a branched alkyl group having carbon atoms of 3 to 12, and the like.

In this embodiment, it is preferred that the organic silicon material constituting the alignment films 3A and 4A contains as the orientation characteristic imparting group at least one of or two or more of these groups. This makes it possible to align the orientation direction of the liquid crystal molecules more appropriately to thereby exhibit more excellent orientation characteristic.

Among the groups mentioned above, a phenyl group, a substituted phenyl group, a phenyl-alkyl group, and a substituted phenyl-alkyl group are particularly preferably used as the organic silicon material. Since use of these groups makes it possible to increase the affinity with liquid crystal molecules, the liquid crystal molecules are aligned in a stable sate, thereby enabling to have more excellent orientation characteristic.

As the organic silicon material described above, organopolysilsesquioxane having a cage structure or a partially cleaved cage structure is preferably used. Use of such a material makes it possible to change the relative abundance (relative existing ratio) between the affinity and the orientation characteristic in an arbitral manner. Further, it is also possible to obtain an alignment film having a high heat resistance and a high visual light transmission property.

Further, a weight average molecular weight of the organic silicon material is preferably in the range of 500 to 50,000, and more preferably in the range of 700 to 50,000. This makes it possible to obtain an alignment film which is stable in optical and physical properties.

Furthermore, an average thickness of the alignment film 3A and 4A is preferably in the range of 0.01 to 10 μm, more preferably in the range of 0.01 to 0.1 μm, and even more preferably in the range of 0.02 to 0.05 μm. If the average thickness of the alignment film is less than the lower limit value, there is a likelihood that the function as the alignment film can not be sufficiently exhibited depending on the composition of the organic silicon material and the like. On the other hand, if the average thickness of the alignment film exceeds the upper limit value, a driving voltage therefore is also increased and thus there is a possibility that a TFT can not be driven depending on the kind thereof.

The transparent conductive film 5 is arranged on an outer surface of the alignment film 3A, that is on a surface of the alignment film 3A opposite to the surface thereof which faces the liquid crystal layer 2. Similarly, the transparent conductive film 6 is arranged on an outer surface of the alignment film 4A, that is on a surface of the alignment film 4A opposite to the surface thereof which faces the liquid crystal layer 2.

The transparent conductive films 5 and 6 have a function of driving (changing an orientation of) the liquid crystal molecules of the liquid crystal layer 2 when an electrical current flows therebetween.

Control for the electrical current flowing between the transparent conductive films 5 and 6 is performed by controlling an electric current supplied from a control circuit (not shown in the figure) connected to the transparent conductive films.

The transparent conductive films 5 and 6 have electrical conductivity and are formed of, for example, indium tin oxide (ITO), or tin oxide ($SnO_2$).

The substrate 9 is arranged on an outer surface of the transparent conductive film 5, that is, on a surface of the transparent conductive film 5 opposite to the surface thereof which faces the alignment film 3A. Similarly, the substrate 10 is arranged on an outer surface of the transparent conductive film 6, that is, on a surface of the transparent conductive film 6 opposite to the surface thereof which faces the alignment film 4A.

The substrates 9 and 10 have a function of supporting the liquid crystal layer 2, the alignment films 3A and 4A, and the transparent conductive films 5 and 6 described above as well as the polarizing films 7A and 8A described later. A material forming the substrates 9 and 10 is not specifically limited. Examples of the material include glass such as quartz glass and a plastic material such as polyethylene terephthalate. Among these materials, in particular, a material formed of glass such as quartz glass is preferable. This makes it possible to obtain a liquid crystal panel that is less likely to be warped or bent and has excellent stability. In this regard, it is to be noted that seal material, wiring, and the like are omitted from FIG. 1.

The polarizing film (a sheet polarizer or a polarization film) 7A is arranged on an outer surface of the substrate 9, that is on a surface of the substrate 9 opposite to the surface thereof which faces the transparent conductive film 5. Similarly, the polarizing film (a sheet polarizer or a polarization film) 8A is arranged on an outer surface of the substrate 10, that is on a surface of the substrate 10 opposite to the surface thereof which faces the transparent conductive film 6.

Examples of a constituent material forming the polarizing films 7A and 8A include polyvinyl alcohol (PVA) and the like. These polarizing films may be formed of a material obtained by doping iodine in the constituent material mentioned above.

Further, as the polarizing films 7A and 8A, it is possible to use films obtained by extending the films formed of the above-mentioned material in uniaxial direction.

By using such polarizing films 7A and 8A, it is possible to more surely perform control for light transmittance by adjusting an amount of electrical current flowing between the transparent conductive films 5 and 6.

A direction of the polarizing axis of each of the polarizing films 7A and 8A is usually determined according to an orientation direction of each of the inorganic alignment films 3A and 4A.

Next, a method of forming an alignment film according to the present invention will be explained.

In this regard, it is to be noted that hereinbelow a description will be made with regard to an exemplary case of a method of forming an alignment film of the present invention where the alignment film is constituted from organopolysilsesquioxane having a cage structure or a partially cleaved cage structure.

The method of forming the alignment film of this embodiment comprises the steps of: a polysilsesquioxane material preparation step for preparing a polysilsesquioxane (polysiloxane) material by condensation polymerization of two or more kinds of alkoxysilane compounds having different compositions; an alignment film formation liquid preparation step for preparing an alignment film formation liquid containing the obtained polysilsesquioxane material; a coating layer formation step for coating the obtained alignment film formation liquid onto a base material to form a coating layer; and a curing step for curing the formed coating layer.

<Polysilsesquioxane Material Preparation Step>

(1) First, a plurality of alkoxysilane compounds are prepared. The plurality of alkoxysilane compounds include an alkoxysilane compound having an affinity imparting group, an alkoxysilane compound having an orientation characteristic imparting group, and an alkoxysilane compound having a curing reaction group which contributes a curing reaction when forming a coating layer described later. These alkoxysilane compounds are prepared so that a relative existing ratio of functional groups such as the affinity imparting group and the orientation characteristic imparting group and the like in the finally obtained alignment film become a desired ratio, in which the ratio of the alkoxysilane compounds is determined so as to correspond to the desired ratio.

By using the plurality kinds of alkoxysilane compounds, it is possible to easily adjust the relative existing ratio of the affinity imparting group and the orientation characteristic imparting group in the organic silicon material constituting the alignment film.

Examples of the alkoxysilane compound having the affinity imparting group include vinyltrimethoxysilane, 3-cyanopropyltriethoxysilane, allyltrimethoxysilane, allyltrimethoxysilane, allyltriisopropoxysilane, butenyltrimethoxysilane, butenyltriethoxysilane, butenyltriisopropoxysilane, 2-cyanoethyltrimethoxysilane, 2-cyanoethyltriethoxysilane, 2-cyanoethyltriisopropoxysilane, 3-cyanopropyltriethoxysilane, 3-cyanopropyltriisopropoxysilane, (3-cyanobutyl)methyltrimethoxysilane, (3-cyanobutyl)ethyltrimethoxysilane, (3-cyanobutyl)methyltriisopropoxysilane, and the like.

Further, examples of the alkoxysilane compound having the orientation characteristic imparting group include phenyltrimethoxysilane, isobutyltrimethoxysilane, phenyltriethoxysilane, phenyltriisopropoxysilane, isobutyltriethoxysilane, isobutyltriisopropoxysilane, isopropyltrimethoxysilane, ispropyltriethoxysilane, isopropyltriisopropoxysilane, phenethyltrimethoxysilane, phenethyltriethoxysilane, phenethyltriisopropoxysilane, and the like.

The curing reaction group is a functional group having the function of curing a coating layer by reacting the curing reaction groups to each other under predetermined conditions. By using the alkoxysilane compound having such a curing reaction group, it is possible to improve a coating layer formation property (precoating property) of the alignment film formation liquid. As a result, it is possible to form an alignment film having stable physical properties.

Examples of such a curing reaction group include a glycidoxy-alkyl group, an alicyclic epoxy-alkyl group, an acryloylalkyl group, a methacryloylalkyl group, a vinyl group, an alkylene group, an alkylidene group, a styryl group, and a styryl-alkyl group and the like.

Among these curing reaction groups, a glycidoxy-alkyl group, an alicyclic epoxy-alkyl group, and a methacryloylalkyl group are preferably used. By using an alkoxysilane compound having such functional groups, it is possible to form a stable alignment film effectively.

Examples of an alkoxysilane compound having such a curing reaction group include 3-glycidoxylpropyltriethoxysilane, 2-(3,4-epoxycyclohexyl)ethyltrimethoxysilane, 3-methacryloxypropyltrimethoxysilane, and the like.

(2) Next, the plural kinds of alkoxysilane compounds described above, water and a dilution solvent (as needed) are mixed to each other in a predetermined mixing ratio to obtain a mixture thereof. Typical examples of such a dilution solvent include alcohols such as methanol, ethanol, isopropyl alcohol, and the like, ethers such as diethyl ether, tetrahydrofuran (THF), and the like ketones such as acetone, methyl isobutyl ketone, and the like, and hydrocarbons such as toluene and the like.

(3) Next, a catalyst for hydrolysis such as an acid catalyst, a base catalyst, and the like is added to the thus obtained mixture with stirring it. These catalysts may be in advance added to the solvent or water which is used for reaction.

Examples of such an acid catalyst (including a solid acid catalyst) include inorganic acids such as sulfuric acid, nitric acid, phosphoric acid, and organic acids such as organic sulphonic acid (e.g. benzenesulphonic acid, p-toluenesulphonic acid, naphthalenesulfonate, methanesulphonic acid, ethanesulphonic acid, and the like).

Further, examples of such a base catalyst includes inorganic bases such as ammonia, sodium hydrate, potassium hydrate, sodium carbonate, potassium-carbonate, and the like, and organic bases such as triamine (e.g. trimethylamine, triethylamine, tributylamine, triethanolamine, pyridine, and the like), tetraalkylammonium hydroxide, choline, and the like. Among these bases, sodium hydrate, potassium hydrate, and tetraalkylammonium hydroxide are preferably used, since they have high activity as a base and are easy to remove after treatment.

(4) After the hydrolysis catalyst has been added, the mixture is heated up to a predetermined temperature with stirring it to thereby cause condensation polymerization reaction of the alkoxysilane compounds.

The predetermined temperature (reaction temperature) is preferably in the range of 5 to 140° C., and more preferably in the range of 30 to 60° C. If the reaction temperature is too high, there is a case that the curing reaction groups are reacted to each other. On the other hand, if the reaction temperature is too low, the progress of the reaction becomes markedly slow.

Further, the reaction time is preferably in the range of 1 to 48 hours, and more preferably in the range of 3 to 18 hours. If the reaction time is too long, there is a case that the curing reaction groups are reacted to each other. On the other hand, if the reaction time is too short, the reaction is not completed.

(5) Next, as needed, other treatments such as neutralization, removal of the dilution solvent, drying, and the like are performed.

Through the processes mentioned above, it is possible to obtain a polysilsesquioxane material having a cage structure or a partially cleaved cage structure (that is, a polysiloxane material).

<Alignment film Formation Liquid Preparation Step>

Thereafter, an alignment film formation liquid (orientation film formation liquid) which contains the polysilsesquioxane material obtained in the above step is prepared.

In this regard, it is to be noted that the polysilsesquioxane material obtained in the above step may be used to an alignment film formation liquid as it is, or any solvent or the like may be added thereto as needed. Further, a curing agent (polymerization initiator) may be added to the alignment film formation liquid as needed. By using such an alignment film formation liquid, curing of the coating layer (which will be described later in detail) can be carried out easily.

Examples of such a curing agent include photopolymerization initiators such as benzophenone, 1-hydroxy cyclohexyl phenyl ketone, (thiophenoxyphenyl) diphenyl sulphonium hexafluoro phosphate, bis(diphenyl sulphonium) diphenyl thioether hexafluoro phosphate, and the like, and thermal polymerization initiator such as azobisisobutyronitrile, azobismethylbutyronitrile, and the like. These curing agents may be used singly or in combination with two or more of them.

Further, the alignment film formation liquid may be subjected to filtration treatment as needed. This make it possible to eliminate impurities contained in the alignment film formation liquid, thereby enabling to form an alignment film having an uniform thickness effectively.

<Coating Layer Formation Step>

Thereafter, the alignment film formation liquid obtained in the above step is applied onto the base material (base materials 100 and 101) to form a coating layer formed of the alignment film formation liquid.

As for a method for applying the alignment film formation liquid onto the base material, various methods such as a gravure coating method, a bar coating method, a spray coating method, a spin coating method, a knife coating method, a roll coating method, a die coating method and the like can be employed.

<Curing Step>

Thereafter, the thus formed coating layer is cured to form an alignment film (alignment films 3A and 4A). The curing of the coating layer can by carried out by heat treatment, energy ray irradiation treatment and the like. Examples of the energy ray include visible ray, ultraviolet ray, radiation ray, infrared ray, and the like.

By carrying out such treatment, the curing reaction groups described above are allowed to be polymerized to each other through radical polymerization, cationic polymerization, condensation polymerization and the like, so that the coating layer is cured to form the alignment film. As a result, a substrate for electronic devices which is composed from the base material and the alignment film formed on the base material can be obtained.

In this regard, it is preferred that the curing of the coating layer is carried out after moisture and/or solvent contained in the alignment film formation liquid for forming the coating layer have been removed, that is, after drying treatment has been carried out for the coating layer. This makes it possible to form an alignment film having a uniform film thickness effectively.

Alternatively, the curing of the coating film may be carried out through two steps, which include a preliminary curing of the coating layer carried out by irradiation of energy rays, and a secondary curing carried out by heat treatment after the preliminary curing. Namely, the coating layer may be completely cured after it has been pre-cured by a relatively low energy. This also makes it possible to form an alignment film having a uniform film thickness effectively.

Further, rubbing treatment may be carried out after the curing of the coating layer. This makes it possible to obtain an alignment film having more excellent orientation characteristic.

Hereinbelow, a description will be made with regard to a second embodiment of the liquid crystal panel of the present invention.

Figure 2:
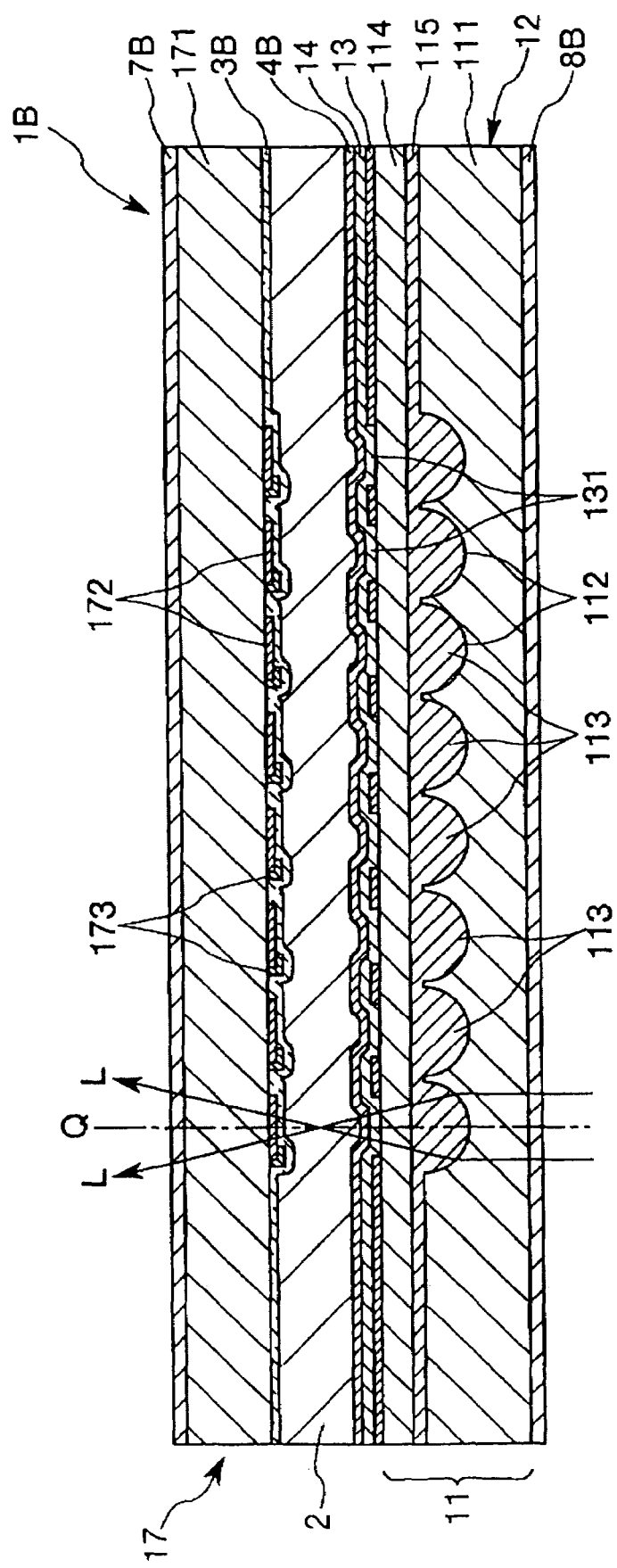
FIG. 2 is a schematic longitudinal sectional view showing the liquid crystal panel of the second embodiment of the present invention.

FIG. 2 is a schematic longitudinal sectional view showing the liquid crystal panel in the second embodiment of the present invention. Differences of a liquid crystal panel 1B shown in FIG. 2 from the liquid crystal panel in the first embodiment will be mainly explained below, and explanations on the matters same as those in the first embodiment will be omitted.

As shown in FIG. 2, a liquid crystal panel (a TFT liquid crystal panel) 1B includes a TFT substrate (a liquid crystal driving substrate) 17, an alignment film 3B joined to the TFT substrate 17, an opposed substrate for liquid crystal panel 12, an alignment film 4B joined to the opposed substrate for liquid crystal panel 12, a liquid crystal layer 2 consisting of liquid crystal filled in a gap between the alignment film 3B and the alignment film 4B, a polarizing film 7B joined to an outer surface of the TFT substrate (the liquid crystal driving substrate) 17, that is a surface of the TFT substrate 17 which is opposite to a surface thereof which faces the alignment film 3B, and a polarizing film 8B joined to an outer surface of the opposed substrate for liquid crystal panel 12, that is a surface of the opposed substrate for liquid crystal panel 12 which is opposite to a surface thereof which faces the alignment film 4B.

The alignment films 3B and 4B are formed by a method same as the method of forming the alignment films 3A and 4A of the first embodiment (the method of forming an alignment film of the present invention). The polarizing films 7B and 8B are the same as the polarizing films 7A and 8A of the first embodiment, respectively.

The opposed substrate for liquid crystal panel 12 includes a microlens substrate 11, a black matrix 13 that is provided on a surface layer 114 of the microlens substrate 11 and in which openings 131 are formed, and a transparent conductive film (a common electrode) 14 that is provided on the surface layer 114 to cover the black matrix 13.

The microlens substrate 11 includes a substrate with concave portions for microlenses (a first substrate) 111 in which a plurality of (a large number of) concave portions (concave portions for microlenses) each having a concaved curved surfaced are formed and the surface layer (a second substrate) 114 that is joined to, via a resin layer (an adhesive layer) 115, a surface of the substrate with concave portions for microlenses 111 in which the concave portions 112 are formed. In the resin layer 115, microlenses 113 are formed with resin filled in the concave portions 112.

The substrate with concave portions for microlenses 111 is manufactured from a planar base material (transparent substrate). The plural (large number of) concave portions 112 are formed on a surface of the substrate with concave portions for microlenses 111. It is possible to form the concave portions 112 with a dry etching method, a wet etching method, or the like using a mask.

The substrate with concave portions for microlenses 111 is formed of glass or the like.

In this regard, it is preferred that a coefficient of thermal expansion of the base material is preferably substantially equal to a coefficient of thermal expansion of a glass substrate 171 (e.g., a ratio of the coefficients of thermal expansion of the base material and the glass substrate 171 is about 1/10 to 10). Consequently, in a liquid crystal panel to be obtained, warp, bending, peeling, and the like caused by a difference of the coefficients of thermal expansion when temperature changes can be effectively prevented.

From such a viewpoint, it is preferred that the substrate with concave portions for microlenses 111 and the glass substrate 171 are formed of the same kind of material. Consequently, warp, bending, peeling, and the like caused by a difference of the coefficients of thermal expansion when temperature changes can be effectively prevented.

In particular, when the microlens substrate 11 is used for a TFT liquid crystal panel made of high-temperature polysilicon, it is preferred that the substrate with concave portions for microlenses 111 is formed of quartz glass. The TFT liquid crystal panel has a TFT substrate as a liquid crystal driving substrate. For such a TFT substrate, quartz glass, a characteristic of which less easily changes because of an environment at the time of manufacturing, is preferably used. This makes it possible to obtain a TFT liquid crystal panel having excellent stability, in which warp, bending, and the like less easily occur, by forming the substrate with concave portions for microlenses 111 with quartz glass.

The resin layer (the adhesive layer) 115 covering the concave portions 112 is provided on an upper surface of the substrate with concave portions for microlenses 111.

The concave portions 112 are filled with a material forming the resin layer 115 to thereby form the microlenses 113.

It is possible to form the resin layer 115 from a resin (adhesive) having a refractive index higher than a refractive index of the material forming the substrate with concave portions for microlenses 111. It is possible to suitably form the resin layer 115 with acrylic resin, epoxy resin, ultraviolet curing resin such as acrylic epoxy, or the like.

The planar surface layer 114 is provided on an upper surface of the resin layer 115.

It is possible to form the surface layer (the glass layer) 114 with glass. In this case, it is preferred that a coefficient of thermal expansion of the surface layer 114 is substantially equal to a coefficient of thermal expansion of the substrate with concave portions for microlenses 111 (e.g., a ratio of the coefficients of thermal expansion of the surface layer 114 and the substrate with concave portions for microlenses 111 is about 1/10 to 10). Consequently, warp, bending, peeling, and the like caused by a difference of the coefficients of thermal expansion between the substrate with concave portions for microlenses 111 and the surface layer 114 can be effectively prevented. Such an effect is more effectively obtained when the substrate with concave portions for microlenses 111 and the surface layer 114 are formed from the same kind of material.

When the microlens substrate 11 is used for a liquid crystal panel, from a viewpoint of obtaining a necessary optical characteristic, thickness of the surface layer 114 is usually set to about 5 to 1000 μm and more preferably set to about 10 to 150 μm.

It is also possible to form the surface layer (a barrier layer) 114 with ceramics. Examples of the ceramics that can be used include nitride ceramics such as AlN, SiN, TiN, and BN, oxide ceramics such as $Al_2O_3$ and $TiO_2$, and carbide ceramics such as WC, TiC, ZrC, and TaC. When the surface layer 114 is formed of ceramics, thickness of the surface layer 114 is not specifically limited. However, the thickness of the surface layer 114 is preferably set to about 20 nm to 20 μm and more preferably set to about 40 nm to 1 μm. In this regard, it is to be noted that such a surface layer 114 may be omitted if it is not necessary.

The black matrix 13 has a light blocking function and is formed of metal such as Cr, Al, Al alloy, Ni, Zn, or Ti or resin in which carbon or titanium is dispersed.

The transparent conductive film 14 has electrical conductivity and is formed of indium tin oxide (ITO), indium oxide (IO), or tin oxide ($SnO_2$), or the like.

The TFT substrate 17 is a substrate for driving liquid crystal of the liquid crystal layer 2 and includes a glass substrate 171, plural (a large number of) pixel electrodes 172 provided on the glass substrate 171 and disposed in a matrix form, and plural (a large number of) thin film transistors (TFT) 173 corresponding to the respective pixel electrodes 172. In FIG. 2, a seal material, wiring, and the like are not shown.

Because of the reason described above, the glass substrate 171 is preferably formed of quartz glass.

The pixel electrodes 172 perform charging and discharging between the transparent conductive film (the common electrode) 14 and the pixel electrodes 172 to thereby drive liquid crystal of the liquid crystal layer 2. The pixel electrodes 172 are formed of, for example, a material same as the material of the transparent conductive film 14.

The thin film transistors 173 are connected to the pixel electrodes 172 corresponding to and provided near the thin film transistors 173. The thin film transistors 173 are connected to a control circuit (not shown in the drawings) and controls an electric current supplied to the pixel electrodes 172. Consequently, charging and discharging of the pixel electrodes 172 are controlled.

The alignment film 3B is joined to the pixel electrodes 172 of the TFT substrate 17. The alignment film 4B is joined to the transparent conductive film 14 of the opposed substrate for liquid crystal panel 12. Namely, one alignment film is provided in contact with each of the electrodes.

The liquid crystal layer 2 is formed of a liquid crystal material (liquid crystal molecules). An orientation of the liquid crystal molecules, that is, liquid crystal, changes in response to charging and discharging of the pixel electrodes 172.

In such a liquid crystal panel 1B, usually, one microlens 113, one opening 131 of the black matrix 13 corresponding to an optical axis Q of the microlens 113, one pixel electrode 172, and one thin film transistor 173 connected to the pixel electrode 172 correspond to one pixel.

Incident lights L made incident from the side of the opposed substrate for liquid crystal panel 12 pass through the substrate with concave portions for microlenses 111 and are transmitted through the resin layer 115, the surface layer 114, the openings 131 of the black matrix 13, the transparent conductive film 14, the liquid crystal layer 2, the pixel electrode 172, and the glass substrate 171 while being condensed when the incident lights L pass through the microlenses 113. At this point, since the polarizing film 8B is provided on the incidence side of the microlens substrate 11, when the incident lights L are transmitted through the liquid crystal layer 2, the incident lights change to linear polarized lights. In that case, a polarizing direction of the incident lights L is controlled in association with an orientation state of the liquid crystal molecules of the liquid crystal layer 2. Therefore, it is possible to control luminance of emitted lights by transmitting the incident lights L, which are transmitted through the liquid crystal panel 1B, through the polarizing film 7B.

As described above, the liquid crystal panel 1B has the microlenses 113, and the incident lights L having passed through the microlenses 113 are condensed and pass through the openings 131 of the black matrix 13. On the other hand, in portions of the black matrix 13 where the openings 131 are not formed, the incident lights L are blocked. Therefore, in the liquid crystal panel 1B, unnecessary light is prevented from leaking from portions other than the pixels and attenuation of the incident lights L in the pixel portions is controlled. Therefore, the liquid crystal panel 1B has a high light transmittance in the pixel portions.

It is possible to manufacture the liquid crystal panel 1B by forming the alignment films 3B and 4B on the TFT substrate 17 and the opposed substrate for liquid crystal panel 12 manufactured by the known method, respectively, and, then, joining the TFT substrate 17 and the opposed substrate for liquid crystal panel 12 via a seal material (not shown in the figure), injecting liquid crystal into a gap portion formed by the joining of the TFT substrate 17 and the opposed substrate for liquid crystal panel 12 from filling holes (not shown in the figure) of the gap portion, and then closing the filling holes.

In the liquid crystal panel 1B, the TFT substrate is used as the liquid crystal driving substrate. However, liquid crystal driving substrates other than the TFT substrate such as a TFD substrate, an STN substrate, and the like may be used for the liquid crystal driving substrate.

The liquid crystal panel including the alignment film as described above may be suitably used for a liquid crystal panel having a strong light source and a liquid crystal panel for outdoor use.

Hereinbelow, electronic equipment (a liquid crystal display device) including the liquid crystal panel 1A described above will be explained in detail on the basis of embodiments shown in FIGS. 3 to 5.

Figure 3:
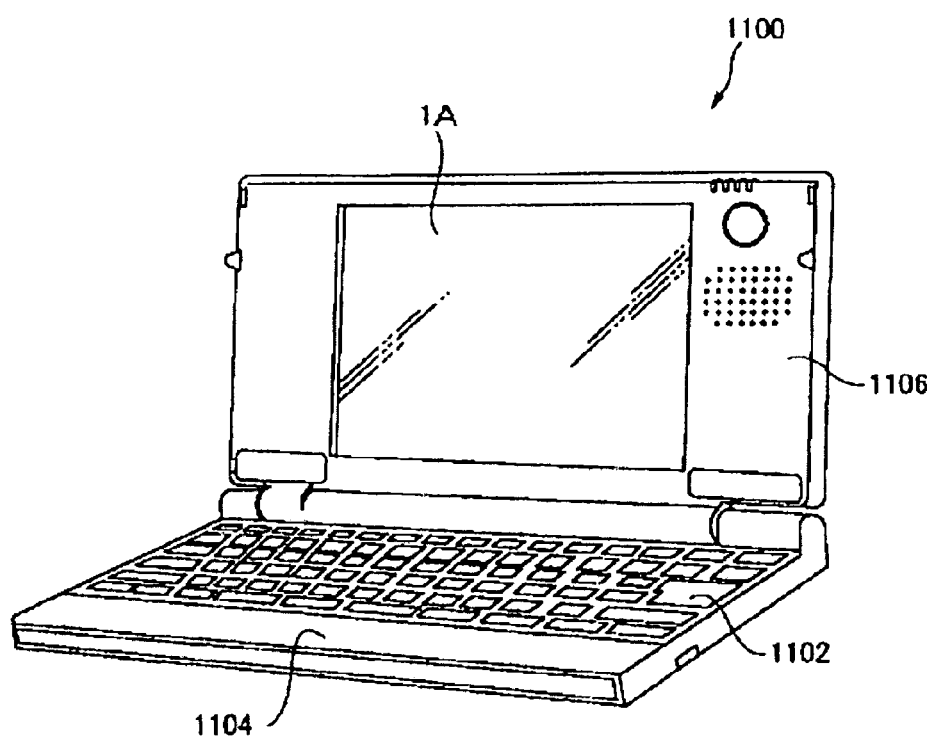
FIG. 3 is a perspective view of a personal computer of a mobile type (or a notebook type) which one example of the electronic equipment of the present invention.

FIG. 3 is a perspective view of a personal computer of a mobile type (or a notebook type) which is one example of the electronic equipment of the present invention.

In the figure, a personal computer 1100 includes a main body unit 1104, which includes a keyboard 1102, and a display unit 1106. The display unit 1106 is supported to be capable of moving rotationally relative to the main body unit 1104 via a hinge structure.

In the personal computer 1100, the display unit 1106 includes the liquid crystal panel 1A and a backlight not shown in the drawing. It is possible to display an image (information) by transmitting light from the backlight through the liquid crystal panel 1A.

Figure 4:
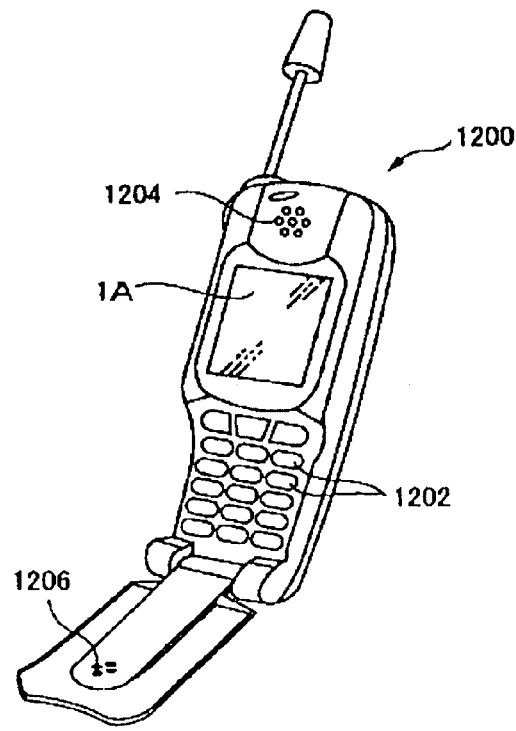
FIG. 4 is a perspective view of a cellular phone (including a Personal Handy-Phone System (PHS)) which is another example of the electronic equipment of the present invention.

FIG. 4 is a perspective view of a cellular phone (including a Personal Handy-Phone System (PHS)) which is another example of the electronic equipment of the present invention.

In the figure, a cellular phone 1200 includes a plurality of operation buttons 1202, an earpiece 1204, and a mouthpiece 1206 as well as the liquid crystal panel 1A and a backlight not shown in the drawing.

Figure 5:
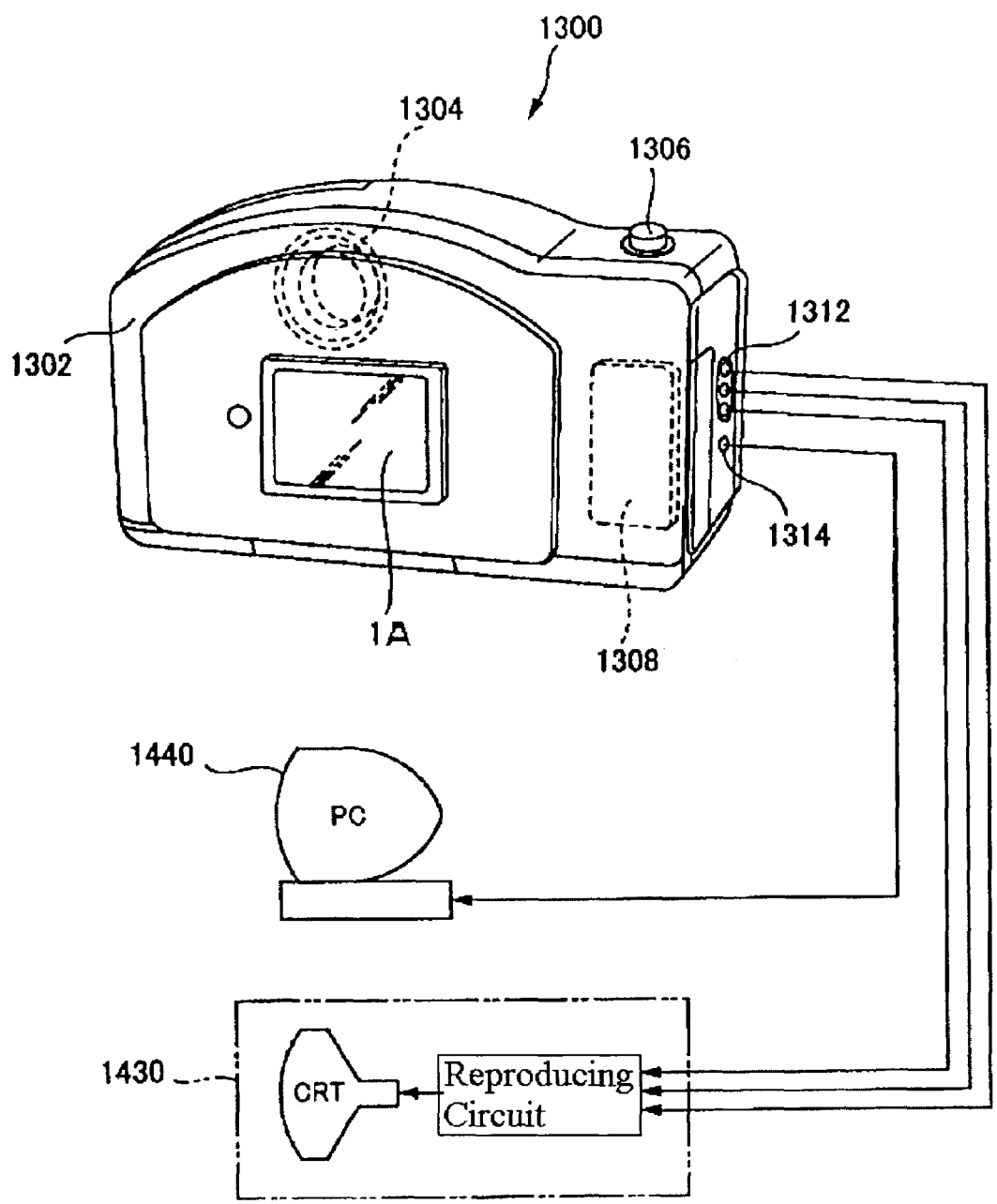
FIG. 5 is a perspective view of a digital still camera which is other example of the electronic equipment of the present invention.

FIG. 5 is a perspective view of a digital still camera which is other example of the electronic equipment of the present invention. In the figure, connection to an external apparatuses is also briefly shown.

A usual camera exposes a silver salt photograph film with an optical image of a subject. On the other hand, a digital still camera 1300 photoelectrically converts an optical image of a subject with an imaging device such as a Charge Coupled Device (CCD) to generate an imaging signal (an image signal).

The liquid crystal panel 1A and a backlight (not shown in the drawing) are provided on a rear surface of a case (a body) 1302 in the digital still camera 1300. The digital still camera 1300 performs display on the basis of the imaging signal generated by the CCD. The liquid crystal panel 1A functions as a finder for displaying a subject as an electronic image.

A circuit board 1308 is set inside the case. A memory that can store the imaging signal is set on the circuit board 1308.

A light-receiving unit 1304 including an optical lens (an imaging optical system), a CCD, and the like is provided on a front side of the case 1302 (in the structure shown in the figure, on a rear side).

When a photographer checks a subject image displayed on the liquid crystal panel 1A and depresses a shutter button 1306, an imaging signal of the CCD at that point is transferred to and stored in the memory of the circuit board 1308.

In the digital still camera 1300, a video signal output terminal 1312 and an input/output terminal 1314 for data communication are provided on a side of the case 1302. As shown in the figure, a television monitor 1430 and a personal computer 1440 are connected to the video signal output terminal 1312 and the input/output terminal 1314 for data communication, respectively, as required. Moreover, the imaging signal stored in the memory of the circuit board 1308 is outputted to the television monitor 1430 and the personal computer 1440 according to predetermined operation.

Next, as an example of the electronic equipment of the present invention, electronic equipment (a liquid crystal projector) using the liquid crystal panel 1B will be explained.

Figure 6:
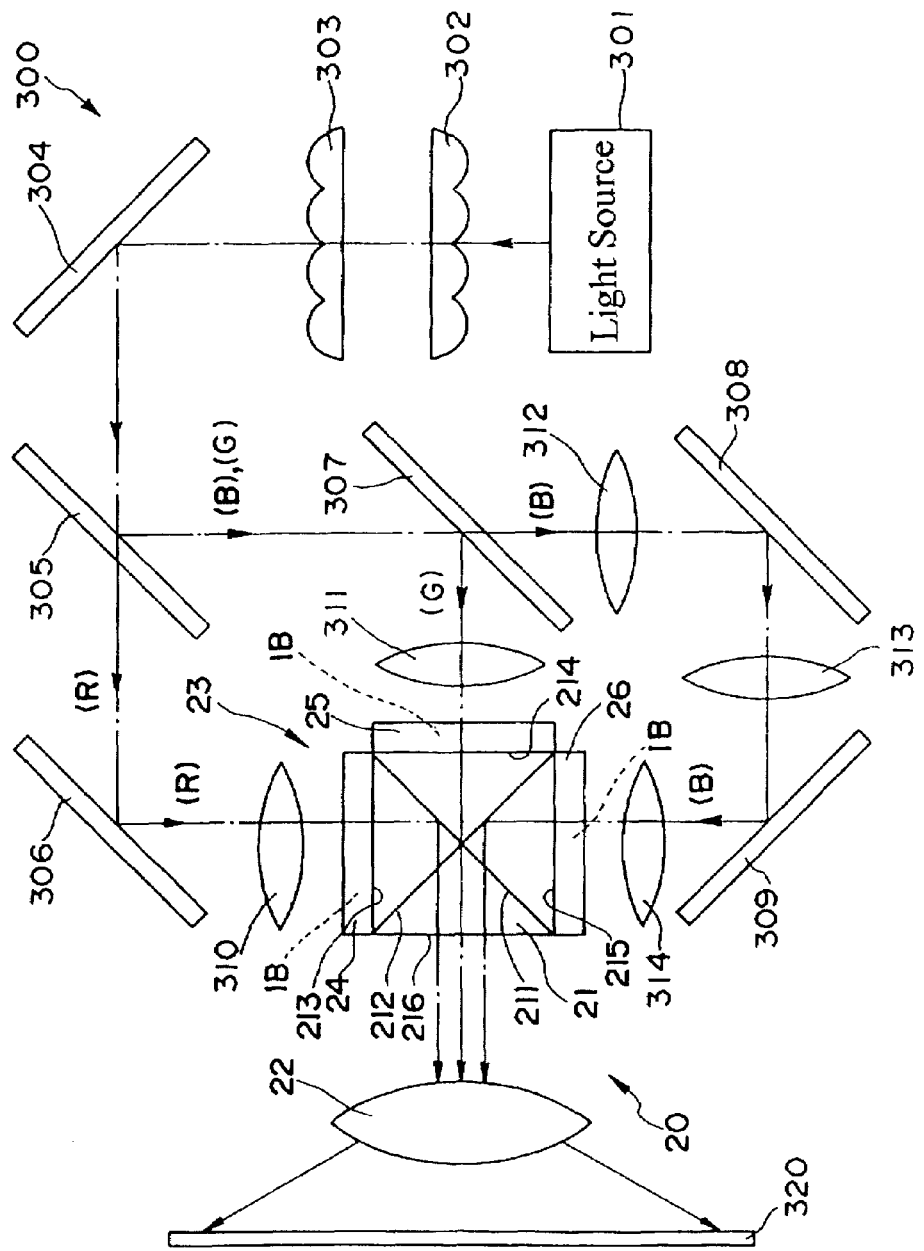
FIG. 6 is a diagram schematically showing an optical system of electronic equipment (a projection type display apparatus) of the present invention.

FIG. 6 is a diagram schematically showing an optical system of electronic equipment (a projection type display apparatus) of the present invention.

As shown in the figure, a projection type display apparatus 300 includes a light source 301, a lighting optical system including plural integrator lenses, a color separation optical system (a light guiding optical system) including plural dichroic mirrors and the like, a liquid crystal light valve (a liquid crystal light shutter array) (for red) 24 corresponding to a red color, a liquid crystal light valve (a liquid crystal light shutter array) (for green) 25 corresponding to a green color, a liquid crystal light valve (a liquid crystal light shutter array) (for blue) 26 corresponding to a blue color, a dichroic prism (a color combining optical system) 21 on which a dichroic mirror surface 211 for reflecting only red light and a dichroic mirror surface 212 for reflecting only blue light are formed, and a projection lens (a projection optical system) 22.

The lighting optical system includes integrator lenses 302 and 303. The color separating optical system includes mirrors 304, 306, and 309, a dichroic mirror 305 that reflects blue light and green light (transmits only red light), a dichroic mirror 307 that reflects only green light, a dichroic mirror 308 that reflects only blue light (or a mirror that reflects blue light), and condensing lenses 310, 311, 312, 313, and 314.

The liquid crystal light valve 25 includes the liquid crystal panel 1B. The liquid crystal light valves 24 and 26 have the same structure as the liquid crystal light valve 25. The liquid crystal panels 1B included in the liquid crystal light valves 24, 25, and 26 are respectively connected to a driving circuit (not shown in the drawing).

In the projection type display apparatus 300, the dichroic prism 21 and the projection lens 22 constitute an optical block 20. The optical block 20 and the liquid crystal light valves 24, 25, and 26 fixedly provided on the dichroic prism 21 constitute a display unit 23.

Hereinafter, operations of the projection type display apparatus 300 will be explained.

White light (a white light beam) emitted from the light source 301, is transmitted through the integrator lenses 302 and 303. A light intensity (a luminance distribution) of this white light is uniformalized by the integrator lenses 302 and 302. In this case, it is preferred that the white light emitted from the light source 301 is white light having a relatively large light intensity. This makes it possible to make an image formed on a screen 320 more clear. In the projection type display apparatus 300, since the liquid crystal panel 1B having excellent light resistance is used, superior long-term stability is obtained even when an intensity of light emitted from the light source 301 is large.

The white light transmitted through the integrator lenses 302 and 303 is reflected to the left side in FIG. 6 by the mirror 304. Blue light (B) and green light (G) in the reflected light are reflected to the lower side in FIG. 6 by the dichroic mirror 305 and red light (R) in the reflected light is transmitted through the dichroic mirror 305.

The red light transmitted through the dichroic mirror 305 is reflected to the lower side in FIG. 6 by the mirror 306. The reflected light is shaped by the condensing lens 310 to be made incident on the liquid crystal light valve for red 24.

The green light in the blue light and the green light reflected by the dichroic mirror 305 is reflected to the left side in FIG. 6 by the dichroic mirror 307. The blue light is transmitted through the dichroic mirror 307.

The green light reflected by the dichroic mirror 307 is shaped by the condensing lens 311 and made incident on the liquid crystal light valve for green 25.

The blue light transmitted through the dichroic mirror 307 is reflected to the left side in FIG. 6 by the dichroic mirror (or the mirror) 308. The reflected light is reflected to the upper side in FIG. 6 by the mirror 309. The blue light is shaped by the condensing lenses 312, 313, and 314 and made incident on the liquid crystal light valve for blue 26.

In this way, the white light emitted from the light source 301 is separated into three primary colors of red, green, and blue, guided to the liquid crystal light valves corresponding thereto, respectively, and made incident thereon.

In this case, respective pixels (the thin film transistors 173 and the pixel electrodes 172 connected thereto) of the liquid crystal panel 1B included in the liquid light valve 24 are subjected to switching control (ON/OFF), that is, modulated by a driving circuit (a driving unit) that operates on the basis of an image signal for red.

Similarly, the green light and the blue light are made incident on the liquid crystal light valves 25 and 26, respectively, and modulated by the respective liquid crystal panels 1B. Consequently, an image for green and an image for blue are formed. In this case, respective pixels of the liquid crystal panel 1B included in the liquid crystal light valve 25 are subjected to switching control by a driving circuit that operates on the basis of an image signal for green. Further, respective pixels of the liquid crystal panel 1B included in the liquid crystal light valve 26 are also subjected to switching control by a driving circuit that operates on the basis of an image signal for blue.

Consequently, the red light, the green light, and the blue light are modulated by the liquid crystal light valves 24, 25, and 26, respectively, and an image for red, an image for green, and an image for blue are formed.

The image for red formed by the liquid crystal light valve 24, that is, the red light from the liquid crystal light valve 24 is made incident on the dichroic prism 21 from a surface 213, reflected to the left side in FIG. 6 on the dichroic mirror surface 211, transmitted through the dichroic mirror surface 212, and then emitted from an emission surface 216.

The image for green formed by the liquid crystal light valve 25, that is, the green light from the liquid crystal light valve 25 is made incident on the dichroic prism 21 from a surface 214, transmitted through the dichroic mirror surfaces 211 and 212, and then emitted from the emission surface 216.

The image for blue formed by the liquid crystal light valve 26, that is, the blue light from the liquid crystal light valve 26 is made incident on the dichroic prism 21 from a surface 215, reflected to the left side in FIG. 6 on the dichroic mirror surface 212, transmitted through the dichroic mirror surface 211, and then emitted from the emission surface 216.

In this way, the lights of the respective colors from the liquid crystal light valves 24, 25, and 26, that is, the respective images formed by the liquid crystal light valves 24, 25, and 26 are combined by the dichroic prism 21. Consequently, a color image is formed. This image is projected (magnified and projected) on the screen 320 set in a predetermined position by the projection lens 22.

In addition to the personal computer (the mobile personal computer) in FIG. 3, the cellular phone in FIG. 4, the digital still camera in FIG. 5, and the projection type display apparatus in FIG. 6 described above, examples of the electronic equipment of the present invention include a television, a video camera, a viewfinder type and monitor direct-view type video tape recorder, a car navigation device, a pager, an electronic notebook (including an electronic notebook with a communication function), an electronic dictionary, an electronic calculator, an electronic game device, a word processor, a workstation, a television telephone, a television monitor for crime prevention, an electronic binocular, a POS terminal, devices including a touch panel (e.g., a cash dispenser in a financial institution and an automatic ticket vending machine), medical devices (e.g., an electronic thermometer, a blood pressure meter, a blood glucose meter, an electrocardiographic display device, an ultrasonic diagnostic device, and a display device for an endoscope), a fish finder, various measurement devices, meters (e.g., meters for a vehicle, an airplane, and a ship), and a flight simulator. It goes without saying that the liquid crystal panel of the present invention is applicable as display units and monitor units for these various electronic devices and equipment.

The present invention has been explained on the basis of the embodiments shown in the figures. However, the present invention is not limited to the embodiments.

For example, in the method of forming an alignment film of the present invention, one or two or more arbitrary aimed steps may be added. Further, for example, in the substrate for electronic devices, the liquid crystal panel, and the electronic equipment of the present invention, the structures of the respective units or components may be replaced with arbitrary structures that exhibit the same functions. Furthermore, it is also possible to add arbitrary structures.

In the explanation of the second embodiment, the projection type display apparatus (the electronic device) has the three liquid crystal panels and the liquid crystal panel of the present invention is applied to all of these liquid crystal panels. However, it is sufficient that at least one of the liquid crystal panels is constituted from the liquid crystal panel of the present invention. In this case, it is preferable to apply the present invention to the liquid crystal panel used for the liquid crystal light valve for blue.

Further, although the embodiments mentioned above were described based on the case that the alkoxysilane compounds have the curing reaction groups, it is not necessary to use such alkoxysilane compounds having the curing reaction groups.

Furthermore, although the embodiments mentioned above were described based on the case that the plural kinds of alkoxysilane compounds are used, the present invention is not limited to such a case. For example, it is possible to use an alkoxysilane compound having a molecule in which the affinity imparting group and the orientation characteristic imparting group are existed.

EXAMPLES

<Manufacturing of a Liquid Crystal Panel>

The liquid crystal panel shown in FIG. 2 was manufactured as described blow.

Example 1

First, a microlens substrate was manufactured as described below.

An unprocessed quartz glass substrate (a transparent substrate) with thickness of about 1.2 mm was prepared, and then it was immersed in a cleaning liquid (a mixed liquid of sulfuric acid and hydrogen peroxide water) at a temperature of 85° C. and cleaned. In this way, a surface of the quartz glass substrate was purified.

Thereafter, films of polysilicon with thickness of 0.4 µm were formed by the CVD method on the surface and a rear surface of the quartz glass substrate, respectively.

Subsequently, openings corresponding to concave portions to be formed were formed in the thus formed polysilicon films.

This was performed as described below. Fist, resist layers having patterns of the concave portions to be formed were formed on the polysilicon films. Subsequently, dry etching with a CF gas was carried out to the polysilicon films to form the openings. Then, the resist layers were removed.

Subsequently, the quartz glass substrate was immersed in an etching liquid (a mixed water solution of 10 wt % of fluoric acid+10 wt % of glycerin) for 120 minutes and wet etching (at an etching temperature of 30° C.) was performed to form the concave portions on the quartz glass substrate.

Thereafter, the quartz glass substrate was immersed in 15 wt % of a tetramethyl ammonium hydroxide water solution to remove the polysilicon films formed on the surface and the rear surface of the quartz glass substrate. In this way, a substrate with concave portions for microlenses was obtained.

Subsequently, an ultraviolet (UV) curing acrylic optical adhesive (with a refractive index of 1.60) was applied, without bubbles, to the surface of the substrate with concave portions for microlenses in which the concave portions were formed. Cover glass (a surface layer) made of quartz glass was joined to the optical adhesive. An ultraviolet ray was irradiated on the optical adhesive to harden the optical adhesive to thereby obtain a laminated member.

Thereafter, the cover glass was grinded and abraded to have thickness of 50 µm to thereby obtain a microlens substrate.

In the thus obtained microlens substrate, thickness of a resin layer was 12 µm.

For the microlens substrate obtained as described above, a light blocking film (a Cr film), that is, a black matrix, with thickness of 0.16 µm formed with openings in positions corresponding to the microlenses of the cover glass was formed using the sputtering method and the photolithography method. Moreover, an ITO film (a transparent conductive film) with thickness of 0.15 µm was formed on the black matrix by the sputtering method to manufacture an opposed substrate for liquid crystal panel.

Next, on the transparent conductive film of the opposed substrate for liquid crystal panel obtained in this way, an alignment film was formed as described below.

First, 5.3 parts by weight of vinyltrimethoxysilane having a vinyl group as the affinity imparting group, 4.8 parts by weight of phenyltrimethoxysilane having a phenyl group as the orientation characteristic imparting group, 14.2 parts by weight of 3-glycidoxylpropyltriethoxysilane having a glycidoxyalkyl group, 533 parts by weight of tetrahydrofuran, and 22.5 part by weight of 1N sodium hydrate were prepared.

These components were put into a three-neck flask with a capacity of 1 liter, and then it was heated at a temperature of 60° C. with stirring for 3 hours. Thereafter, the components in the flask were cooled to room temperature, and then 22.5 parts by weight of 1N hydrochloride was added thereto to neutralize it to thereby obtain a mixture 1.

Thereafter, tetrahydrofuran was removed from the mixture 1 using an evaporator to thereby obtain a mixture 2.

Then, a polysiloxane (that is, polysilsesquioxane having a cage structure) contained in the mixture 2 was extracted from the mixture 2 using 50 parts by weight of toluene to obtain an extract.

Next, the thus obtained extract was cleaned using 50 parts by weight of distilled water and 50 parts by weight of saturated saline, and then the distilled water and the saturated saline ere removed, and the moisture remaining in the extract was dehydrated using anhydrous magnesium sulfate.

Next, after the toluene was removed from the extract which had been cleaned and dehydrated using an evaporator, low-boiling substances contained in the polysiloxane were removed under an atmosphere of reduced pressure of 3.3 Pa to thereby obtain a polysiloxane material.

Then, 0.10 parts by weight of the thus obtained polysiloxane material was mixed with 1.90 parts by weight of a solvent (diethylene glycol ethyl ether acetate) to obtain a mixture 3.

Next, the thus obtained mixture 3 was filtered using a filter having pore size of 0.2 μm to remove impurities contained in the mixture 3.

Next, 0.001 parts by weight of 50 wt % of propylene carbonate solution as a curing agent was added to the thus obtained mixture 3 to obtain an alignment film formation liquid, in which the propylene carbonate was obtained by mixing (thiophenoxyphenyl) diphenyl sulphonium hexafluoro phosphate and bis(diphenyl sulphonium) diphenyl thioether hexafluoro phosphate.

Next, the thus obtained alignment film formation liquid was coated onto the transparent conductive film of the opposed substrate for liquid crystal panel using a spin coater to thereby form a coating layer.

Then, after the thus obtained coating layer was dried for 3 minutes using a hotplate heated at a temperature of 150° C., the coated layer was irradiated with a ray for 5 minutes using a metal hydrate lamp to pre-cure it. Thereafter, the coating layer was heated at a temperature of 200° C. for 3 hours to completely cure it.

Next, rubbing treatment was carried out for the cured coating layer to thereby obtain an alignment film.

The film thickness of the thus formed alignment film was 0.2 μm, and the ratio of the silicon units having the affinity imparting group in one molecule of the organic silicon material constituting the alignment film was 29 mol. %, and the ratio of the silicon units having the orientation characteristic imparting group was 21 mol. %. These values were substantially the same as the ratio of the raw components when the organic silicon material used for forming the alignment film was synthesized. Further, the weight average molecular weight of the organic silicon material was 1,800.

In the same manner as that described above, an alignment film was also formed on a surface of a TFT substrate (made of quartz glass) separately prepared.

The opposed substrate for liquid crystal panel on which the alignment film was formed and the TFT substrate on which the alignment film was formed were joined via a seal material. This joining was performed to shift orientation directions of the alignment films by 90° such that liquid crystal molecules forming the liquid crystal layer were twisted to the left.

Subsequently, liquid crystal (manufactured by Merk Ltd.: MJ99247) was injected into a gap portion formed between the alignment films from filling holes of the gap portion. Then, the filling holes were closed. Thickness of the liquid crystal layer formed was about 3 μm.

Thereafter, a TFT liquid crystal panel having the structure shown in FIG. 2 was manufactured by joining the polarizing film 8B and the polarizing film 7B on an outer surface of the opposed substrate for liquid crystal panel and an outer surface of the TFT substrate, respectively. As the polarizing films, a polarizing film obtained by extending a film formed of polyvinyl alcohol (PVA) in a uniaxial direction was used. Joining directions of the polarizing film 7B and the polarizing film 8B were determined on the basis of the orientation directions of the alignment film 3B and the alignment film 4B, respectively. The polarizing film 7B and the polarizing film 8B were joined such that incident light was transmitted when a voltage was applied and was not transmitted when no voltage was applied.

A pre-tilt angle of the liquid crystal panel manufactured was in the range of 3° to 7°.

Examples 2 to 5

In each of Examples 2 to 5, a liquid crystal panel was manufactured in the same manner as Example 1 except that an alignment film was formed using alkoxysilane compounds shown in Table 1 as the alkoxysilane compounds and that the amount of each alkoxysilane compound was changed as shown in Table 1.

Examples 6 to 8

In each of Examples 6 to 8, a liquid crystal panel was manufactured in the same manner as Example 1 except that an alignment film was formed using alkoxysilane compounds shown in Table 1 as the alkoxysilane compounds, that the amount of each alkoxysilane compound was changed as shown in Table 1, and that benzophenone was used as the curing agent.

Comparative Example 1

A liquid panel was manufactured in the same manner as Example 1 except that a solution of polyimide resin (PI) (manufactured by Japan Synthetic Rubber Corporation: AL6256) was prepared, a film with an average thickness of 0.05 μm was formed on a transparent conductor film of an opposed substrate for liquid crystal panel by the spin coat method, and the rubbing treatment was applied to the film such that a pre-tilt angle was 2° to 3° to form an alignment film. In this Comparative Example 1, a substance like dust was generated when the rubbing treatment was applied.

Comparative Example 2

A liquid crystal panel was manufactured in the same manner as Example 3 except that vinyltrimethoxysilane was not used and the mixing amount of each alkoxysilane was changed as shown in Table.

Comparative Example 3

A liquid crystal panel was manufactured in the same manner as Example 3 except that isobtyltrimethoxysilane was not used and the mixing amount of each alkoxysilane was changed as shown in Table.

<Evaluation of liquid crystal panels>

A light transmittance was continuously measured for each of the liquid crystal panels manufactured in the Examples 1 to 8 and the Comparative Examples 1 to 3. The measurement of the light transmittance was performed by placing the respective liquid crystal panels under temperature of 50° C. and irradiating white light with a light beam density of 151 m/mm² in a state in which no voltage is applied.

As the evaluation of the liquid crystal panels, the liquid crystal panels were evaluated in four criteria as described below with time until a light transmittance from start of the irradiation of the white light of the liquid crystal panel manufactured in the Comparative Example 1 fell by 50% as compared to an initial light transmittance (light resistance time) as a reference.

A: The light resistance time was five times or more as compared to that in the Comparative Example 1.

B: The light resistance time was two times or more and less than five times as compared to that in the Comparative Example 1.

C: The light resistance time was one time or more and less than two times as compared to that in the Comparative Example 1.

D: The light resistance time was inferior to that in the Comparative Example 1.

In Table 1, evaluation results of the liquid crystal panels are shown in an organized manner together with the kinds of alkoxysilane compounds used for forming the alignment films, the mixing amounts thereof, conditions for forming an alignment film, an average thickness of each alignment film, a pre-tilt angle in each of the liquid crystal panels.

In Table 1, each of the alkoxysilane compounds is indicated as follows using abbreviations.

vinyltrimethoxysilane: VI
allyltrimethoxysilane: AL
3-cyanopropyltriethoxysilane: CN
phenyltrimethoxysilane: PH
isobtyltrimethoxysilane: IB
3-glycidoxylpropyltriethoxysilane: GL
2-(3,4-epoxycyclohexyl)ethyltrimethoxysilane: EP
3-methacryloxypropyltrimethoxysilane: MA As it is evident from Table 1, the liquid crystal panel of the present invention shows excellent light resistance as compared to the liquid crystal panel in the Comparative Example 1.

Further, in the liquid crystal panel of the present invention, a sufficient pre-tilt angle was obtained and an orientation state of liquid crystal molecules could be surely regulated. However, in the liquid crystal panels in the Comparative Examples 2 and 3, a sufficient pre-tilt angle was not obtained, and thus it was difficult to regulate an orientation state of liquid crystal molecules.

<Evaluation of a Liquid Crystal Projector (an Electronic Equipment)>

A liquid crystal projector (an electronic equipment) having the structure shown in FIG. 6 was assembled using the TFT liquid crystal panels manufactured in each of the Examples 1 to 8 and Comparative Examples 1 to 3. Each liquid crystal projector was continuously driven for 5000 hours.

As evaluation of the liquid crystal projector, a projected image immediately after the driving and a projected image 5000 hours after the driving were observed and clarity of the projected images was evaluated in four criteria as described below.

A: A clear projected image was observed.

B: A substantially clear projected image was observed.

TABLE 1

| | Alkoxysilane Compound | | | | | | | | | | | |
|---|---|---|---|---|---|---|---|---|---|---|---|---|
| | Affinity imparting Group | | Orientation Characteristic Imparting Group | | Curing Reaction Group | | Condensation Polymerization of Alkoxysilane | | Mw of Organic Silicon Material | Average Thickness of Orientation Film [μm] | Pretilt Angle [°] | Light Resistance |
| | Kind | Amount of Mixing (Parts by Weight) | Kind | Amount of Mixing (Parts by Weight) | Kind | Amount of Mixing (Parts by Weight) | Reaction Temperature | Reaction Time | | | | |
| Example 1 | VI | 5.3 | PH | 4.8 | GL | 14.2 | 60 | 3 | 1800 | 0.2 | 3~7 | A |
| Example 2 | CN | 8.3 | IB | 3.9 | GL | 14.2 | 60 | 3 | 1500 | 0.2 | 3~7 | A |
| Example 3 | VI | 5.3 | IB | 3.9 | GL | 14.2 | 60 | 3 | 1600 | 0.2 | 3~7 | A |
| Example 4 | VI | 5.3 | PH | 4.8 | EP | 14.8 | 60 | 3 | 2000 | 0.2 | 3~7 | A |
| Example 5 | VI | 5.3 | IB | 3.9 | EP | 14.8 | 60 | 3 | 2500 | 0.2 | 3~7 | A |
| Example 6 | VI | 5.3 | PH | 4.8 | MA | 14.9 | 60 | 3 | 1800 | 0.2 | 3~7 | A |
| Example 7 | CN | 8.3 | IB | 3.9 | MA | 14.9 | 60 | 3 | 1500 | 0.2 | 3~7 | A |
| Example 8 | VI | 5.3 | IB | 3.9 | MA | 14.9 | 60 | 3 | 1400 | 0.2 | 3~7 | A |
| Comp. Ex. 1 | — | — | — | — | — | — | — | — | — | 0.05 | 2~3 | — |
| Comp. Ex. 2 | — | — | IB | 3.9 | GL | 14.2 | 60 | 3 | 1600 | 0.2 | 1~2 | C |
| Comp. Ex. 3 | VI | 5.3 | — | — | GL | 14.2 | 60 | 3 | 1600 | 0.2 | 1~2 | C |

C: A projected image slightly inferior in clarity was observed.

D: An unclear projected image was observed.

The results are shown in Table 2.

TABLE 2

|  | Clarity of Projected Image | |
| --- | --- | --- |
|  | Projected Image Immediately After the Driving | Projected Image 5000 Hours After the Driving |
| Example 1 | A | A |
| Example 2 | A | A |
| Example 3 | A | A |
| Example 4 | A | A |
| Example 5 | A | A |
| Example 6 | A | A |
| Example 7 | A | A |
| Example 8 | A | A |
| Comp. Ex. 1 | A | D |
| Comp. Ex. 2 | D | D |
| Comp. Ex. 3 | D | D |

As it is evident from Table 2, even when the liquid crystal projector (the electronic device) manufactured using the liquid crystal panel of the present invention was continuously driven for a long time, a clear projected image was obtained.

On the other hand, in the liquid crystal projector manufactured using the liquid crystal panel of the Comparative Example 1, clarity of a projected image evidently fell as a driving time elapsed. It is considered that this is because orientations of liquid crystal molecules were aligned at an initial stage but an alignment film was deteriorated because of driving in a long period of time. As a result, an orientation characteristic of the liquid crystal molecules fell. In the liquid crystal projectors manufactured using the liquid crystal panel in the Comparative Example 3, a clear projected image was not obtained from an initial stage of driving. It is considered that this is because an orientation characteristic of the alignment film was originally low.

When a personal computer, a cellular phone, and a digital still camera including the liquid crystal panel of the present invention were manufactured and the same evaluation was performed, the same results were obtained.

From these results, it is seen that the liquid crystal panel and the electronic device of the present invention are excellent in light resistance and, even when the liquid crystal panel and the electronic device are used for a long period of time, a stable characteristic is maintained.

Finally, it is to be noted that although certain preferred embodiments of the present invention have been shown and described in detail in the above, it should be understood that various changes and modifications may be made therein without departing from the scope of the appended claims.

What is claimed is:

1. An alignment film for controlling orientation of liquid crystal molecules, the alignment film comprising:
  an organopolysilsesquioxane as a main component of the alignment film, the organopolysilsesquioxane having in its molecule:
  an affinity imparting group increasing affinity to the liquid crystal molecules; and
  an orientation characteristic imparting group controlling orientation of the liquid crystal molecules,
  wherein the organopolysilsesquioxane has a cage structure or a partially cleaved cage structure and is obtained by condensation polymerization of alkoxysilane consisting of alkoxysilane compounds having different compositions,
  the alkoxysilane compounds having different compositions including:
  a first alkoxysilane compound having in its molecule the affinity imparting group being at least one selected from the group consisting of vinyltrimethoxysilane and 3-cyanopropyltriethoxysilane,
  a second alkoxysilane compound having in its molecule the orientation characteristic imparting group being at least one selected from the group consisting of phenyltrimethoxysilane and isobutyltrimethoxysilane, and
  a third alkoxysilane compound having in its molecule a curing reaction group which contributes to a polymerization reaction of the organopolysilsesquioxane, wherein the curing reaction group is at least one selected from the group consisting of:
  3-glycidoxylpropyltriethoxysilane, 2-(3,4-epoxycyclohexyl)ethyltrimethoxysilane and 3-methacryloxypropyltrimethoxysilane, wherein the alignment film is aligned by rubbing treatment.

2. The alignment film as claimed in claim 1, wherein a weight average molecular weight of the organopolysilsesquioxane is in the range of 500 to 50,000.

3. A liquid crystal panel, comprising:
  a liquid crystal layer having both sides;
  a pair of alignment films respectively contacted at the both sides of the liquid crystal layer, each alignment film being formed from the alignment film defined in claim 1; and
  a pair of electrodes provided on the alignment films respectively, for driving the liquid crystal molecules of the liquid crystal layer.

4. Electronic equipment provided with the liquid crystal panel defined by claim 3.

* * * * *